Patented June 2, 1936

2,042,638

UNITED STATES PATENT OFFICE 2,042,638

COATED MATERIALS AND METHOD OF PRODUCING SAME

John C. Siemann, Kenmore, N. Y., assignor to Du Pont Cellophane Company, Inc., New York, N. Y., a corporation of Delaware No Drawing. Application November 21, 1929, Serial No. 408,932

19 Claims. (Cl. 91—68)

This invention relates to coated materials and method of producing same. More particularly, it relates to sheets or films of regenerated cellulose rendered resistant to the penetration of moisture and water vapor therethrough to a substantial degree and to the process of preparing same, said materials also being transparent, flexible, non-tacky, non-odorless and capable of use as wrapping tissues.

Sheets or films of regenerated cellulose have found extensive use as wrapping tissues. By reason of their transparency, packages of marked beauty are obtained. These sheets, however, are not resistant to the penetration of moisture or water vapor therethrough. They, therefore, cannot be used to effectively wrap products, such as bread, cake, cigars, fruits or other products which are susceptible to gain or loss of moisture and which are desired to be maintained in their substantially original state for a substantial period of time. A wrapping tissue for achieving this object, viz., the retention of the original moisture present in the product and the prevention of moisture from the atmosphere or otherwise contacting therewith, has already been produced by treating sheets or films of regenerated cellulose with a surface coating composition including a cellulose derivative, a gum or resin, a wax and a plasticizer. Such a material produces excellent results when used as a wrapping tissue for breads, cakes, fruits and the like. It has, however, been found that in wrapping products having an exceedingly high moisture or water content, such as ice cream, butter, frozen or wet fish and the like, there is a tendency after a prolonged period of time for the surface coating to become loose. Inasmuch as the base is not resistant to the passage or penetration of moisture and water vapor therethrough, the effectiveness of the wrapper is materially impaired.

I have found that I can overcome the abovementioned defects and prepare a product, which is resistant to the passage or penetration of moisture and water vapor, transparent, flexible, nonodorous and non-tacky, having a surface coating which will not be substantially loosened when subjected to water for a substantial period of time by impregnating said sheets or films with a softener which is preferably insoluble in water, but soluble in or wetted by one or more of the components of the solvent mixture used in the surface coating composition prior to the application of the surface coating composition.

It is, therefore, an object of this invention to provide a method of preparing sheets or films of regenerated cellulose having a surface coating whereby said sheets or films are rendered substantially resistant to the passage or penetration of moisture and water vapor therethrough, and which surface coating is not loosened by water for a substantial period of time.

Another object of this invention is to provide a method of preparing sheets or films of regenerated cellulose having a surface coating, whereby said sheets or films are rendered substantially resistant to the passage or penetration of moisture and water vapor therethrough and said surface coating is not loosened by water for a substantial period of time by incorporating in the sheets or films of regenerated cellulose a softener, said softener being soluble in or wetted by one or more of the ingredients comprising the composite solvent of the surface coating composition.

A further object of this invention comprises impregnating a sheet or film of regenerated cellulose in the gel or undried state with a softener prior to the application of the surface coating composition, said softener being soluble in or wetted by the solvent mixture of the surface coating composition.

An additional object of this invention is to provide a method of preparing sheets or films of regenerated cellulose having a surface coating, whereby said films or sheets are rendered substantially resistant to the passage or penetration of moisture or water vapor therethrough, said surface coating not being loosened by water for a substantial period of time, which comprises removing all or part of the water and/or water-soluble softener present in said sheets or films prior to the incorporation of the softener and the application of the surface coating composition.

Other objects will appear from the following description and appended claims.

In the manufacture of sheets or films of regenerated cellulose a solution of viscose is ejected from a hopper into a coagulating bath, whereby a continuous film of material is obtained. The coagulated film is then regenerated. If desired, the coagulating and regenerating steps may be carried out simultaneously. Subsequently, the film is washed, desulphured, bleached, again washed, and dried. Prior to the drying and while the film is still in the gel state, it is usually impregnated with glycerin whereby added flexibility and suppleness are imparted to the film. Finally, the film is cut into sheets of the desired sizes. If the sheets are to be of the variety which resists the passage and penetration of moisture and water vapor therethrough, the film or sheet may be treated with a composition of matter comprising, for example, a cellulose derivative, a gum or resin, a wax and a plasticizer dissolved in suitable solvents or mixtures thereof with or without diluents. The coated material is then dried at a temperature substantially equal to or higher than the melting point of the wax employed in the coating composition.

As above explained, this surface coating becomes loosened from the base when it contacts with water for a long period of time. I have found that, if the common water-soluble softener (glycerin) is removed and the film impregnated with a softener which is insoluble in water and soluble in the solvent of the surfacing composition prior to the application of the surface coating, a satisfactorily-adhering surface coating will be produced, said coating effectively resisting the effects of water for a substantial period of time.

In carrying out the invention, various modes of procedure may be used. The most practical procedure is to start with a cellulose film which has been coagulated, regenerated, washed, desulphured and bleached, but which has not been glycerinated or dried. At this stage the film is still in a gel state and contains a considerable amount of water. The water is removed by extraction with a solvent miscible with water, for example, alcohol, and the last traces of the alcohol are removed with a solvent miscible with the alcohol and also miscible with the solvents contained in the moistureproofing composition. The sheet, thus free from the water which was associated with it, is impregnated with one of the softeners which is insoluble in water and soluble in the solvent of the moistureproofing composition. As an alternative, the water could be removed from the gel film by the usual process of drying.

It is not, of course, absolutely necessary to remove the water from the film before the impregnation with the softener, and by the suitable choice of a softener material, this matter can be impregnated in the cellulose by means of an emulsion or a suspension. The cellulose film, having been washed and purified, is passed through an aqueous bath containing a suspension or emulsion of a softener which is insoluble in water but soluble in the solvents of the moistureproofing composition, and the film so impregnated is passed on to the usual drying mechanism wherein the water is evaporated, leaving the softener uniformly impregnated throughout the film. The film, having been impregnated, can then be coated wtih the moistureproofing composition.

It is obvious that the process is equally applicable to dried sheets or films of regenerated cellulose produced in the ordinary course of manufacture and containing glycerin incorporated therein. Such sheets or films are treated for the removal of the glycerin and water by a process such as that which has been described; namely, a series of extractions with solvents which are miscible with the water and glycerin followed by extractions with the solvents which are soluble in the solvents of the moistureproofing composition and miscible with the first solvent. An obvious alternative of this is to remove the glycerin with a common water-wash and to impregnate the cellulose film with a suspension of the water-insoluble softener in water followed by the usual drying.

The softeners incorporated in the sheets or films of regenerated cellulose, as above-mentioned, are water insoluble and are soluble in or wetted by the solvents of the moistureproofing composition. I have found that such softeners as tri-cresyl phosphate, triacetin, and dibutyl tartrate are particularly suitable. The degree of suppleness and flexibility of the final product depends, of course on the amount of softener which is incorporated in the film.

The composition which may be employed for the surface coating comprises, as previously stated, a cellulose derivative, a gum or resin, a wax, a plasticizer and a solvent or solvent mixture.

The cellulose derivatives may be nitrocellulose, cellulose acetate or cellulose ether and the like.

The gum or resin which may be used may be ester gum, resin, gum-mastic, copal resins or synthetic resins. These gums or resins may be used either separately or in combination with one another.

For the wax, high melting-point paraffin wax is preferable. Other waxes, such as beeswax, carnauba wax, ceresin wax and the like, or a combination thereof, may be used.

The plasticizer which may be employed comprises any of the compounds or mixtures having a high boiling point and which are known as "plasticizers" or "softeners" for cellulose derivatives. Preferably, a plasticizer which is substantially colorless and odorless is desirable. Tri-cresyl phosphate, triphenyl phosphate, diamyl phthalate, dibutyl phthalate and castor oil have produced satisfactory results.

The above ingredients, when used in proper proportions and with a suitable solvent or solvent mixture, produce a material which, after evaporation of the solvent, is not only resistant to the passage or penetration of moisture and water vapor therethrough, but is flexible without cracking, perfectly transparent, devoid of greasiness or tackiness, and has the required tensile strength for which it is desired to be used.

Various proportions of the above ingredients may be used. Satisfactory results have been obtained when the ingredients are used in the following percentages by weight:

| | Per cent |
|---|---|
| Cellulose derivative | 30–70 |
| Gum | 20–60 |
| Wax | 2–10 |
| Plasticizer | 5–30 |

The following specific example produces the desired results:

| | Per cent |
|---|---|
| Nitrocellulose | 42.2 |
| Gum dammar | 25.9 |
| Paraffin wax | 7.2 |
| Tri-cresyl phosphate | 24.7 |

The wax and cellulose derivative base ordinarily do not mix to form a clear transparent film. However, by a proper choice of gum, it has been found possible to make the combined gum and wax mix with the plasticizer and cellulose derivative. The solvent mixture is then chosen to retain the gum, wax, cellulose derivative and plasticizer in their proper proportions in complete solution until the entire solvent has evaporated.

It is desirable to employ solvents for the above ingredients up to 50% or over by weight in order to maintain the wax in solution during the process of drying the coating or sheet. Also, it is desirable to employ relatively low percentages of intermediate boiling solvents for the cellulose derivative. By employing these solvents in a proportion of 10% and under of the total solvent, a very rapid drying of the coating is prevented. While the particular solvent must be determined separately for the particular composition, I have found that the following specific solvent combination, when used with the above example, produces satisfactory results:

| | Percentage based on total volume of solvent |
|---|---|
| | Percent |
| Alcohol | 25 |
| Ether | 43 |
| Toluene | 18 |
| Butyl acetate | 14 |

In order to more clearly explain the invention, the following specific examples are set forth. It is to be understood that these ingredients are not limitative of the invention but merely describe certain modifications thereof:

Example I.—100 cc. of tri-cresyl phosphate, 30 cc. of oleic acid and a small quantity of water are mixed together and thoroughly agitated. While this mixture is being agitated, 8 cc. of 28% ammonia solution diluted with water is added and the agitation continued for a little while until the dispersion or emulsion is substantially complete. Sufficient water is then added to make approximately 2200 cc.

Into the composition prepared, as above described, a sheet or film of regenerated cellulose which has not been dried and which is in its gel state is introduced. After passing through the composition, the excess thereof is removed in any suitable manner. The film is then dried at approximately 90° C., and after drying, the film is coated with the moistureproofing composition, comprising a cellulose derivative, a gum or a resin, a wax, and a plasticizer, and subjected to a temperature approximately the same as, or higher than, the melting point of the wax employed in the moistureproof composition. If desired, the coated sheet may be subjected to a humidifying atmosphere whereby the final product's flexibility may be increased.

Example II.—A sheet or film of regenerated cellulose which has not been dried and which is in a gel state is treated with 95% alcohol to remove the water associated with the cellulose. After several washings with 95% alcohol, the cellulose is finally treated with toluene to remove the last traces of the alcohol. The sheet is then immersed in a 10% solution of tri-cresyl phosphate in toluene. The excess solution is removed and the solvent evaporated. The film is then coated with the moistureproofing composition, and finished as set forth in Example I.

Example III.—A sheet of regenerated cellulose, which has been impregnated with glycerin and has been dried is immersed in 95% alcohol, and this process is repeated until substantially all of the glycerin and water have been removed from the cellulose. The surplus alcohol is removed in any suitable manner, and the film is immersed in a 2% solution of triacetin in 95% alcohol. After the removal of the excess liquid, the film is dried and then coated with the moistureproofing composition and finished as set forth in Example I.

The product resulting from the herein-described method comprises a sheet or film of regenerated cellulose having a moistureproof coating, comprising a cellulose derivative, a gum or resin, a wax and a plasticizer. It is perfectly transparent, non-odorous, non-tacky and resistant to the passage of water vapor and moisture therethrough to a substantial degree. In addition, the moistureproof surface coating adheres to the base and when exposed in contact with water, it does not loosen therefrom for a substantial period of time.

The expression "resistant to the passage or penetration of moisture or water vapor" is intended to include also that property described by the term "moistureproof", by which is meant the ability to resist the diffusion of water vapor to an extent at least as great as or exceeding that displayed by ordinary waxed papers employed as wrappers and functioning to resist the penetration of water vapor therethrough to a substantial degree for a substantial period of time, depending on the article being wrapped and/or being approximately 7 times or more as effective as uncoated sheets or films of regenerated cellulose when tested in accordance with the test set forth in the Journal of Industrial and Engineering Chemistry on page 575, vol. 21, No. 6 (June 1929).

Since it is obvious that various changes may be made in the specific details above set forth, it is to be understood that this invention is not limited thereto except as set forth in the appended claims.

I claim:
1. An article of manufacture comprising a sheet or film of regenerated cellulose impregnated with a composition consisting essentially of a water-insoluble softener for regenerated cellulose and combined with a moistureproofing composition rendering said article moistureproof, said moistureproofing composition being bonded to the base by said water-insoluble softener, said article being transparent, flexible and non-tacky.

2. An article of manufacture comprising a sheet or film of regenerated cellulose impregnated with a composition consisting essentially of a water-insoluble softener for regenerated cellulose and having a surface coating of a moistureproofing composition, said surface coating being bonded to the base by said water-insoluble softener, said article being transparent, flexible and non-tacky.

3. An article of manufacture comprising a sheet or film of regenerated cellulose impregnated with a composition consisting essentially of a water-insoluble softener for regenerated cellulose and having a moistureproof surface coating comprising a cellulose derivative, a gum, a wax and a plasticizer, said surface coating being bonded to the base by said water-insoluble softener, said article being transparent, flexible and non-tacky.

4. An article of manufacture comprising a sheet or film of regenerated cellulose impregnated with a composition consisting essentially of a water-insoluble softener for regenerated cellulose selected from the class which consists of a tri-cresyl phosphate, triacetin and dibutyl tartrate and having a surface coating of a moistureproofing composition rendering said article resistant to the passage or penetration of moisture and water vapor therethrough, said article being transparent, flexible and non-tacky.

5. An article of manufacture comprising a sheet or film of regenerated cellulose impregnated with a composition consisting essentially of tricresyl phosphate and combined with a moistureproofing composition rendering the article resistant to the passage or penetration of moisture and water vapor therethrough, said article being transparent, flexible and non-tacky.

6. An article of manufacture comprising a sheet or film of regenerated cellulose impregnated with a composition consisting essentially of tricresyl phosphate and having a moistureproof surface coating comprising a cellulose derivative, a gum, a wax and a plasticizer, said article being resistant to the passage or penetration of moisture and water vapor therethrough, transparent, flexible and non-tacky.

7. In a method of preparing a moistureproof, transparent and flexible material, the steps which comprise treating a sheet or film of regenerated cellulose in the undried state with a composition consisting essentially of tricresyl phosphate and a liquid vehicle, removing the excess of said composition, drying said treated sheet or film, and applying a moistureproofing coating composition comprising a cellulose derivative, a gum, a wax, a plasticizer and a solvent, said tricresyl phosphate being soluble in said solvent.

8. In a method of preparing a moistureproof, transparent and flexible material, the steps which comprise treating a sheet or film of regenerated cellulose in the undried state with a composition consisting of tricresyl phosphate dispersed in a liquid vehicle, removing the excess of the dispersion, drying said treated sheet or film, and applying a moistureproofing coating composition comprising a cellulose derivative, a gum, a wax, a plasticizer and a solvent, said tricresyl phosphate being soluble in said solvent.

9. In a method of preparing a moistureproof, transparent and flexible material, the steps which comprise treating a sheet or film of regenerated cellulose in the undried state with a dispersion comprising tricresyl phosphate, removing the excess of said dispersion and drying said treated sheet or film and applying a surface coating composition to render the material resistant to the passage or penetration of moisture or water vapor therethrough, said composition containing a solvent in which the tricresyl phosphate is soluble.

10. In a method of preparing transparent, flexible and moistureproof regenerated cellulose sheeting, the steps which comprise impregnating regenerated cellulose sheeting with a composition consisting of a water-insoluble softener for regenerated cellulose dispersed in an aqueous medium, and applying a moistureproofing composition containing a solvent in which said softener is soluble to produce a transparent moistureproof surface coating bonded to the base sheeting.

11. In a method of preparing transparent, flexible and moistureproof regenerated cellulose sheeting which comprises producing transparent regenerated cellulose sheeting in the gel state, impregnating the sheeting with a composition consisting of a water-insoluble softener for regenerated cellulose dispersed in an aqueous medium, and applying a moistureproofing composition containing a solvent in which said softener is soluble to produce a transparent moistureproof surface coating bonded to the base sheeting.

12. In a method of preparing transparent, flexible and moistureproof regenerated cellulose sheeting, the steps which comprise impregnating regenerated cellulose sheeting with a composition consisting of a water-insoluble softener for regenerated cellulose dispersed in an aqueous medium, said softener being selected from the class which consists of tricresyl phosphate, triacetin and dibutyl tartrate, drying the impregnated sheeting, and applying a moistureproofing composition containing a solvent in which said softener is soluble to produce a transparent moistureproof surface coating bonded to the base sheeting.

13. In a method of preparing transparent, flexible and moistureproof regenerated cellulose sheeting which comprises producing transparent regenerated cellulose sheeting in the gel state, impregnating the sheeting with a composition consisting of a water-insoluble softener for regenerated cellulose dispersed in an aqueous medium, said softener being selected from the class which consists of tricresyl phosphate, triacetin and dibutyl tartrate, drying the impregnated sheeting, and applying a moistureproofing composition containing a solvent in which said softener is soluble to produce a transparent moistureproof surface coating bonded to the base sheeting.

14. In a method of preparing transparent, flexible and moistureproof regenerated cellulose sheeting, the steps which comprise impregnating regenerated cellulose sheeting with a composition consisting essentially of a water-insoluble softener for regenerated cellulose selected from the class which consists of tricresyl phosphate, triacetin and dibutyl tartrate, and applying a moistureproofing surface coating composition containing a solvent in which said softener is soluble.

15. In a method of preparing transparent, flexible and moistureproof regenerated cellulose sheeting, the steps which comprise producing a transparent regenerated cellulose sheeting in the gel state, removing the water by solvent displacement, impregnating the sheeting with a composition consisting essentially of a water-insoluble softener for regenerated cellulose selected from the class which consists of tricresyl phosphate, triacetin and dibutyl tartrate, and applying a moistureproofing surface coating composition containing a solvent in which said softener is soluble.

16. In a method of preparing transparent, flexible and moistureproof regenerated cellulose sheeting, the steps which comprise impregnating regenerated cellulose sheeting with a solution consisting essentially of a solvent having dissolved therein a water-insoluble softener for regenerated cellulose selected from the class which consists of tricresyl phosphate, triacetin and dibutyl tartrate, drying the impregnated sheeting, and applying a moistureproofing surface coating composition containing a solvent in which said softener is soluble.

17. In a method of preparing transparent, flexible and moistureproof regenerated cellulose sheeting which comprises producing transparent regenerated cellulose sheeting in the gel state, removing the water by solvent displacement, impregnating the sheeting with a solution consisting essentially of a solvent having dissolved therein a water-insoluble softener for regenerated cellulose selected from the class which consists of tricresyl phosphate, triacetin and dibutyl tartrate, drying the impregnated sheeting, and applying a moistureproofing surface coating composition containing a solvent in which said softener is soluble.

18. In a method of preparing transparent, flexible and moistureproof regenerated cellulose sheeting, the steps which comprise impregnating regenerated cellulose sheeting with a composition consisting essentially of a water-insoluble softener for regenerated cellulose and applying a moistureproofing composition containing a solvent in which said softener is soluble to produce a transparent, moistureproof surface coating bonded to said base.

19. In a method of preparing transparent, flexible and moistureproof regenerated cellulose sheeting, the steps which comprise producing a transparent regenerated cellulose in the gel state, removing the water by solvent displacement, impregnating the sheeting with a composition consisting essentially of a water-insoluble softener for regenerated cellulose, and applying a moistureproofing composition containing a solvent in which said softener is soluble to produce a transparent, moistureproof surface coating bonded to said base.

JOHN C. SIEMANN.

CERTIFICATE OF CORRECTION.

Patent No. 2,042,638.  June 2, 1936.

JOHN C. SIEMANN.

It is hereby certified that error appears in the printed specification of the above numbered patent requiring correction as follows: Page 2, first column, line 56, for "wtih" read with; page 3, second column, after line 26, insert the following paragraphs:

> In the above description the expression "sheets or films of regenerated cellulose" is used. It is to be understood that this expression is not limited to any particular type or species but is intended to cover sheets or films of regenerated cellulose of any manufacture including cellulosic sheets or films in which a portion thereof has been gelatinized and/or regenerated.
> In the claims the term "solvent" is intended to also include a composite solvent or a solvent mixture containing one or more ingredients which dissolves and/or wets the softener.

and that the said Letters Patent should be read with these corrections therein that the same may conform to the record of the case in the Patent Office.

Signed and sealed this 4th day of August, A. D. 1936.

Henry Van Arsdale (Seal)  Acting Commissioner of Patents.